United States Patent
Lu et al.

(10) Patent No.: US 8,712,641 B2
(45) Date of Patent: Apr. 29, 2014

(54) STABILITY CONTROL SYSTEM WITH BODY-FORCE-DISTURBANCE HEADING CORRECTION

(75) Inventors: Jianbo Lu, Livonia, MI (US); Li Xu, Novi, MI (US); Bengt Johan Henrik Jacobson, Mölnlycke (SE); Mikael Thor, Göteborg (SE)

(73) Assignee: Ford Global Technologies, LLC, Dearborn, MI (US)

( * ) Notice: Subject to any disclaimer, the term of this patent is extended or adjusted under 35 U.S.C. 154(b) by 1077 days.

(21) Appl. No.: 12/428,788

(22) Filed: Apr. 23, 2009

(65) Prior Publication Data

US 2009/0271073 A1    Oct. 29, 2009

(30) Foreign Application Priority Data

Apr. 25, 2008  (EP) .................................. 08155165

(51) Int. Cl.
*B60G 17/00* (2006.01)
*B60G 23/00* (2006.01)

(52) U.S. Cl.
USPC ................... 701/41; 701/36; 701/37; 701/82; 180/271; 340/440

(58) Field of Classification Search
USPC ............. 701/36, 37, 38, 41, 70, 1, 72, 78, 83; 180/271; 303/146, 166, 189; 340/440
See application file for complete search history.

(56) References Cited

U.S. PATENT DOCUMENTS 5,732,377 A * 3/1998 Eckert .............................. 701/83
6,640,173 B1 * 10/2003 Zheng .............................. 701/41
6,830,122 B2 * 12/2004 Kroppe .......................... 180/197
7,739,001 B2 * 6/2010 Kato et al. ......................... 701/2
2011/0166744 A1 * 7/2011 Lu et al. .......................... 701/34

FOREIGN PATENT DOCUMENTS

| CN | 1695973 A | 11/2005 |
|---|---|---|
| DE | 2633588 A1 | 2/1978 |
| DE | 10 2004 033 900 A1 | 7/2005 |
| DE | 10 2006 034 516 A1 | 10/2007 |

(Continued)

OTHER PUBLICATIONS

State Intellectual Property Office of the People's Republic of China, Notification of First Office Action for the corresponding Chinese Patent Application No. 200910005667.X, dated Dec. 3, 2012.

(Continued)

*Primary Examiner* — Adam Tissot
(74) *Attorney, Agent, or Firm* — Raymond L. Coppiellie; Brooks Kushman P.C.

(57) ABSTRACT

A yaw stability control system for a vehicle detects and eliminates the vehicle yaw angle resulting from a body-force-disturbance and returns the vehicle to a pre disturbance heading. A yaw rate module generates a signal indicative of the vehicle yaw rate error. A yaw angle error module is triggered in response to a body-force-disturbance being detected by a body-force-disturbance detection unit, and performs integrations of the yaw rate signals to calculate a yaw angle error in order to obtain a correction of the vehicle yaw angle resulting from the body-force-disturbance. A yaw control module uses the yaw angle error in combination with the yaw rate error for a limited time period to generate yaw control signals that are sent to the vehicle brakes and/or active steering system for performing vehicle yaw stability control operations a signal to perform a body-force-disturbance yaw stability control operation for.

12 Claims, 3 Drawing Sheets

(56) References Cited

FOREIGN PATENT DOCUMENTS

| | | |
|---|---|---|
| EP | 1 595 768 A2 | 11/2005 |
| WO | 2006 106009 A1 | 10/2006 |
| WO | 2007 044744 A2 | 4/2007 |

OTHER PUBLICATIONS

State Intellectual Property Office of the People's Republic of China, Notification of Second Office Action for the corresponding Chinese Patent Application No. 200910005667.X mailed Jul. 22, 2013.

* cited by examiner

STABILITY CONTROL SYSTEM WITH BODY-FORCE-DISTURBANCE HEADING CORRECTION

CROSS-REFERENCE TO RELATED APPLICATIONS

This application claims foreign priority benefits under 35 U.S.C. §119(a)-(d) to EP 08155165.7 filed Apr. 25, 2008, which is hereby incorporated by reference in its entirety.

BACKGROUND

1. Technical Field

The present invention is related to a yaw stability control system and method for an automotive vehicle, and specifically to a yaw control system and method capable of correcting for a change in vehicle heading caused by a body-force-disturbance experienced by the vehicle.

2. Background Art

Several vehicle stability control systems, which are used to augment the driving capability of a vehicle operator, currently exist. Those control systems include anti-yaw control-lock system (ABS), traction control system (TCS), and electronic stability augmentation systems. Electronic stability augmentation systems are identified by a number of different names such as electronic stability control (ESC) systems, yaw stability control (YSC) systems. Systems of this kind are also sometimes called ESP (Electronic Stability Program) systems or DSTC (Dynamic Stability Traction Control) systems.

The stability control/augmentation systems are utilized to maintain controlled and stable vehicle operations for improved vehicle and occupant safety. The stability control systems are often used to maintain control of a vehicle following a driver's desired travel direction, to prevent the vehicle from spinning out, and/or plough out, and/or to prevent or mitigate a roll over event.

More specifically, the known yaw stability control systems typically function by comparing the driver's desired direction of vehicle travel based upon the steering wheel angle with the actual path of travel, which is determined from motion sensors located on the vehicle. By regulating the amount of braking at each corner of the vehicle and the traction force of the vehicle and steering, the desired path of travel may be maintained.

Existing stability control systems are designed to correct undesired vehicle motion caused by a tire-force-disturbance, such as a tire-force-differential due to a road surface disturbance or due to a mismatch between the driving intention of a driver and a road surface condition. This mismatch usually happens when there is a significant difference between the front and the rear tire lateral forces applied to the vehicle (referred to as the lateral tire-force-differential), or there is a significant difference between the right and the left tire longitudinal tire-forces (referred to as the longitudinal tire-force-differential), or a combination thereof. Such a tire-force-differential is called a tire-force-disturbance (TFD).

The existing yaw stability control systems are generally effective in controlling the undesired vehicle motions due to the aforementioned tire-force-disturbance. The yaw stability control systems activate yaw controls, reduce engine torque, and/or vary the driving torque at individual wheels or axles so as to generate an active tire-force-differential to counteract the effect of the tire-force-disturbance. That is, the control mechanism and the vehicle disturbance are from the same source: the tire-force variations or the tire-force-differentials.

An undesired yaw motion may also be generated by a yaw-moment-disturbance caused when a vehicle receives a force-disturbance other than a tire-force-disturbance. An example of which is an external force-disturbance that is applied to the vehicle body, which is called a body-force-disturbance (BFD). A body-force-disturbance may occur when a vehicle hits a fixed object, such as a tree, or when the vehicle is hit by another moving object, such as a vehicle. A body-force-disturbance may also occur when the vehicle experiences a sudden strong wind gust applied to the vehicle body.

While the magnitude of the tire-force-disturbance is limited by the driving condition of the road surface, the magnitude of a body-force-disturbance can be much higher. For example, the collision of two moving vehicles may generate a body-force-disturbance with a magnitude that is several factors larger than the total tire-forces. In a light collision, the magnitude of the body-force-disturbance might be very close to the total tire-force. The body-force-disturbance is different from the tire-force-disturbance generated from the tire-force-differentials. A vehicle experiencing a body-force-disturbance may have balanced tire-forces (i.e., there are no significant tire-force-differentials among the 4 tires) and may have larger than normal vehicle motion such as yaw motion.

The yaw stability control systems that exist in today's production vehicles are designed to provide stabilization assistance for the driver during normal road conditions, i.e. when the vehicle's acceleration is limited by the road friction. The efficiency of yaw stability control systems after involved vehicles receive a body-force-disturbance from light collision impacts depends heavily on how the driver reacts after the body-force-disturbance.

It is possible for a first impact to destabilize the vehicle, e.g. by a lateral hit in the rear of the vehicle. In such cases, the vehicle changes travel direction during the short time period of impact due to a resulting large magnitude of vehicle yaw rate, and the driver then has to correct very quickly if he/she should avoid leaving the road, lane, or other intended path of travel. Prior art yaw rate stability controllers usually perform yaw control intervention as a function of yaw rate error, where the yaw rate error is determined as the difference between a yaw rate target determined based on the driver's intended steering and a sensed yaw rate measurement from a yaw rate sensor, and will hence not intervene after the vehicle has stabilized, since there is no large yaw rate error even if there is a large yaw angle (heading angle) error.

In many driving situations, it may be advantageous if the operation range of the stability control is extended to the range of vehicle dynamics which involves the application of a body-force-disturbance, e.g. a light vehicle-to-vehicle impact. Herewith is proposed a way to keep the stability control activated during a body-force-disturbance event such that it is possible to eliminate a vehicle yaw angle resulting from a body-force-disturbance and return the vehicle to a desired heading which may be the pre body-force-disturbance yaw angle, i.e. vehicle heading.

SUMMARY

The present invention provides an improved yaw stability control system for a vehicle which is able to return the vehicle to a pre body-force-disturbance heading, or at least a heading close thereto, following a vehicle heading altering body-force-disturbance.

According to a first embodiment of the invention, a yaw stability control system for an automotive vehicle comprises at least one yaw rate sensor generating a vehicle yaw rate signal, a yaw rate model generator receiving a steering input and generating a reference yaw rate signal, a yaw rate error module comparing the vehicle yaw rate signal with the reference yaw rate signal and calculating a yaw rate error signal, and a yaw control module receiving the yaw rate error signal and generating control signals to be sent to at least one yaw actuator. The embodiment further comprises a yaw angle error module receiving the reference yaw rate signal and generating a reference yaw angle signal, receiving the vehicle yaw rate signal and generating a vehicle yaw angle signal, and comparing the reference yaw angle signal and the vehicle yaw angle signal to generate a yaw angle error signal; and at least one body-force-disturbance sensor unit detecting a body-force-disturbance experienced by the vehicle and establishing a time-of-occurrence of the BFD. The yaw control module uses the yaw angle error signal in combination with the yaw rate error signal to generate the control signals during a time period based on the time-of-occurrence of the BFD.

According to a second aspect of the present invention, a method for improving yaw stability of an automotive vehicle subjected to a body-force-disturbance comprises the steps of determining a reference yaw rate value based at least in part upon a driver steering input; detecting a vehicle yaw rate of the vehicle and generating a vehicle yaw rate signal; comparing the reference yaw rate signal and the vehicle yaw rate signal to calculate a yaw rate error value; activating at least one yaw control actuator in response to at least the yaw rate error signal to reduce the yaw rate error; calculating a reference yaw angle signal from at least the reference yaw rate signal; calculating a vehicle yaw angle signal from at least the vehicle yaw rate signal; comparing the reference yaw angle signal and the vehicle yaw angle signal to calculate a yaw error signal; detecting the body-force-disturbance experienced by the vehicle and establishing a time-of-occurrence of the BFD; and, for a time period associated with the time-of-occurrence, activating the at least one yaw control actuator in response to the yaw angle error signal in combination with the yaw rate error signal.

It will be appreciated that features of the invention are susceptible to being combined in any combination without departing from the scope of the invention as defined by the accompany claims.

BRIEF DESCRIPTION OF THE DRAWINGS

By way of example only, embodiments of the present invention will now be described with reference to the accompanying drawings wherein.

Figure 1:
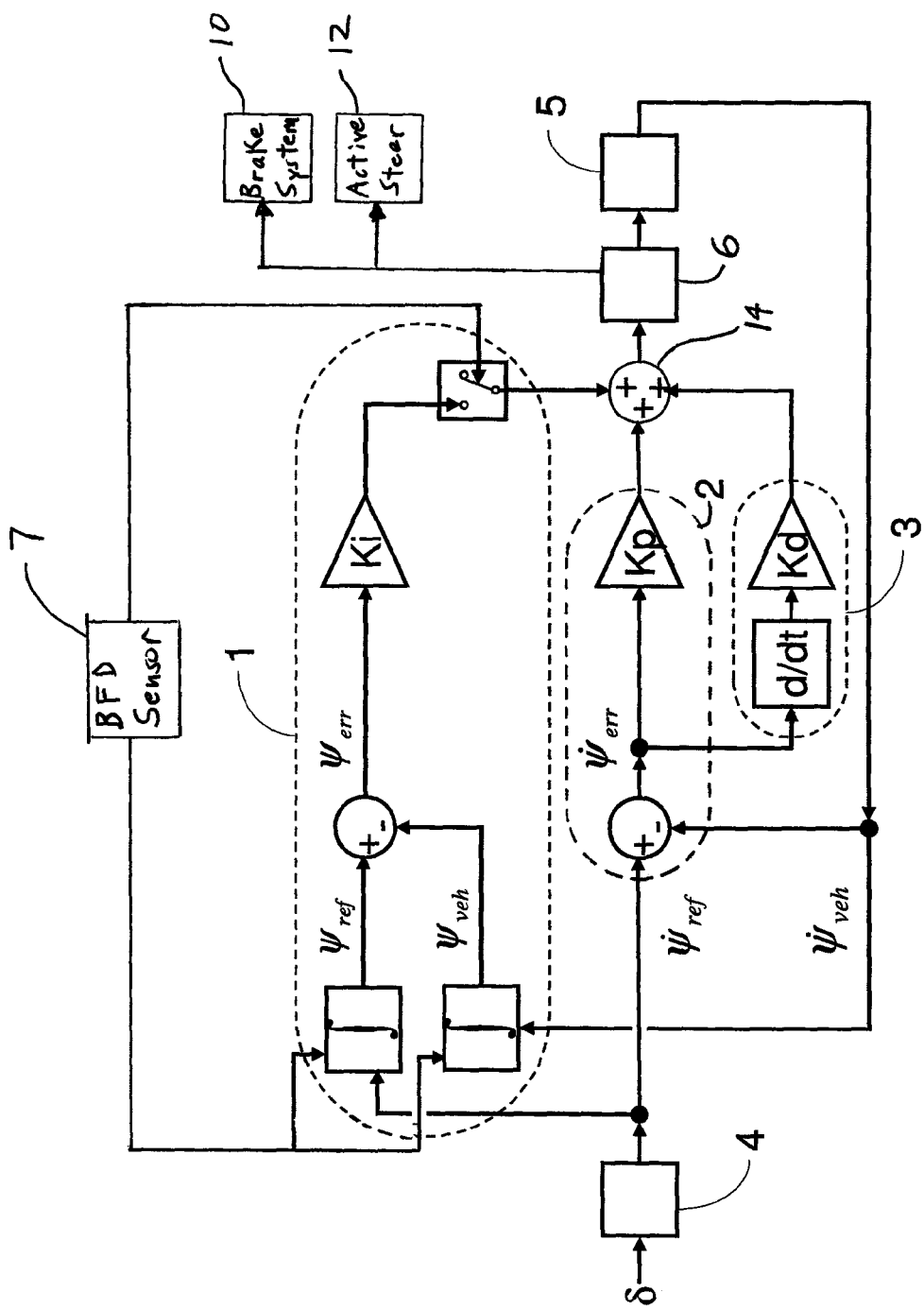
FIG. 1 is a schematic diagram of a stability control system and method including a yaw angle error module.

Still other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein. The same reference numerals will be used for illustrating corresponding features in the different drawings.

DETAILED DESCRIPTION

FIG. 1 illustrates a yaw stability control system and method of operation that is responsive to a yaw rate error, here shown as having a yaw rate proportional module 2 and a yaw rate derivative module 3. The yaw rate error signal $\dot{\psi}_{err}$ is determined or calculated as the difference between a reference or target yaw rate signal $\dot{\psi}_{ref}$ provided from a yaw rate reference model 4 to which the steering wheel angle δ is input, and a sensed vehicle yaw rate signal $\dot{\psi}_{veh}$, provided by vehicle dynamic sensors 5. This yaw rate error $\dot{\psi}_{err}$ is subjected to the yaw rate proportional 2 and yaw rate derivative 3 modules of the controller algorithm. Scaling or gain factors Kp and Kd are applied to the respective signals as required, then the signals are combined at an arithmetic node 14 to create an input to a yaw control module 6. This input may be seen as carrying a yaw torque request. In response to the signals received from the yaw rate proportional 2 and yaw rate derivative 3 modules of the controller algorithm, yaw control module 6 generates control signals that activate or control yaw actuators such as a wheel brake system 10 and/or an active steering system 12.

A yaw angle control module 1 is provided in addition to the yaw rate proportional 2 and yaw rate derivative 3 modules of the control system/method. The yaw angle control module is triggered by a determination of the vehicle being subjected to a body-force-disturbance (BFD), as sensed or detected by a BFD sensor unit 7. The yaw angle control module 1 performs an integration of the vehicle yaw rate $\dot{\psi}_{veh}$ to generate a vehicle yaw angle $\psi_{veh}$ and an integration of the reference or target yaw rate $\dot{\psi}_{ref}$ to generate a reference yaw angle $\psi_{ref}$. The difference between the two values represents a yaw angle error $\psi_{err}$ which is scaled suitably by Ki and input to the arithmetic node 14 at the appropriate time and for the appropriate time period. Thus the yaw angle error $\psi_{err}$ provides to the yaw control module 6 the change in heading angle, i.e. yaw angle error, resulting from the body-force-disturbance.

BFD sensors 7 are used to detect a body-force-disturbance when the vehicle is hit by a moving object (such as another vehicle, a gust of wind, or a thrown substance such as water, dirt, or snow) or hits a stationary or fixed object. The BFD sensors 7 may be located anywhere on the vehicle and generate BFD detection signals in response to a body-force-disturbance. The BFD sensors 7 may include sensors that are used as vehicle status sensors, such as the yaw rate sensor 5, a lateral acceleration sensor, and a longitudinal acceleration sensor. The BFD sensors 7 also may be in the form of one or more accelerometers, rate gyros, piezo electric sensors, piezo resistive sensors, pressure sensors, contact sensors, strain gauges, crash sensors, close environment sensors, or may be in some other form known in the art.

In order to handle yaw rates reaching very high values during a very short period of time, such as may be caused by an impact, integration may be performed in a processor, not shown, e.g. the same processor as to which the sensors are connected. It may utilize both the yaw rate sensor 5, normally used for yaw stability control, and BFD sensors 7, i.e. sensors used for crash sensing. The yaw angle signal may then be communicated to a stability control processor (not shown), which may be arranged in the yaw control module 6.

A BFD sensor 7 may be configured to differentiate between "light" and "severe" body-force-disturbances. Hereby, in an alternative embodiment the driver steering wheel angle δ may be input to the reference model in response to detection of a "light" body-force-disturbance while a driver steering wheel angle from prior to the body-force-disturbance may be input to the yaw rate reference model 4 in response to detection of a "severe" body-force-disturbance. In this way any effects of driver's panic steering during a "severe" body-force-disturbance event may be suppressed.

Closed-loop control of yaw angle error, using a yaw angle reference which is the integration of a yaw rate reference, from degrees/second to degrees, during and after the BFD event allows the vehicle to return to a pre-BFD course.

This solution is to be considered as an estimation of driver's intention. This is done in terms of integrating the driver's intention from immediately before the vehicle is subjected to the body-force-disturbance, e.g. during a time period a few seconds before an impact, to shortly after the impact, e.g. a few seconds after the impact. Thus the changes from normal yaw stability functionality are securely time limited to the short time period after the body-force-disturbance event. The influence of the yaw angle control module 1 (the yaw angle error $\psi_{err}$) should suitably be arranged to decrease gradually ("fade out") towards the end of the time period, in order to gradually return full control to a driver of the vehicle.

The end of the time period may be determined through having time periods of a predetermined length or alternatively the end of the time period could be set to be determined in relation to the side slip angle β of the vehicle, e.g. such that the time period is associated to the part of a BFD event when the side slip angle β is too large for braking intervention to produce useful stabilizing tire-to-road forces. This could e.g. be determined as a time period ending as the side slip angle β of the vehicle falls below 40 degrees. The side slip angle β may be detected by one or more of the sensors used in the BFD sensor unit 7 or the yaw rate sensor unit 5, or by a separate sensor.

As mentioned above, in order to assure that one includes the first part of the BFD event, integration of the reference and vehicle yaw rates may be started shortly before impact. Preferably integration should be started 0.1 to 1.0 second before impact. In order to achieve this, window integrals may be used by which the yaw rate error is integrated over defined time windows surrounding the impact instance.

A simple implementation of the proposed solution for post impact heading angle correction has been implemented and verified in a simulation environment. The simulation results show a substantial increase in the level of assistance which the system provides for the passive driver model. This added assistance is illustrated in FIG. 2, where the difference in yaw control (i.e. brake system) pressure for the different interventions is depicted.

Figure 2:
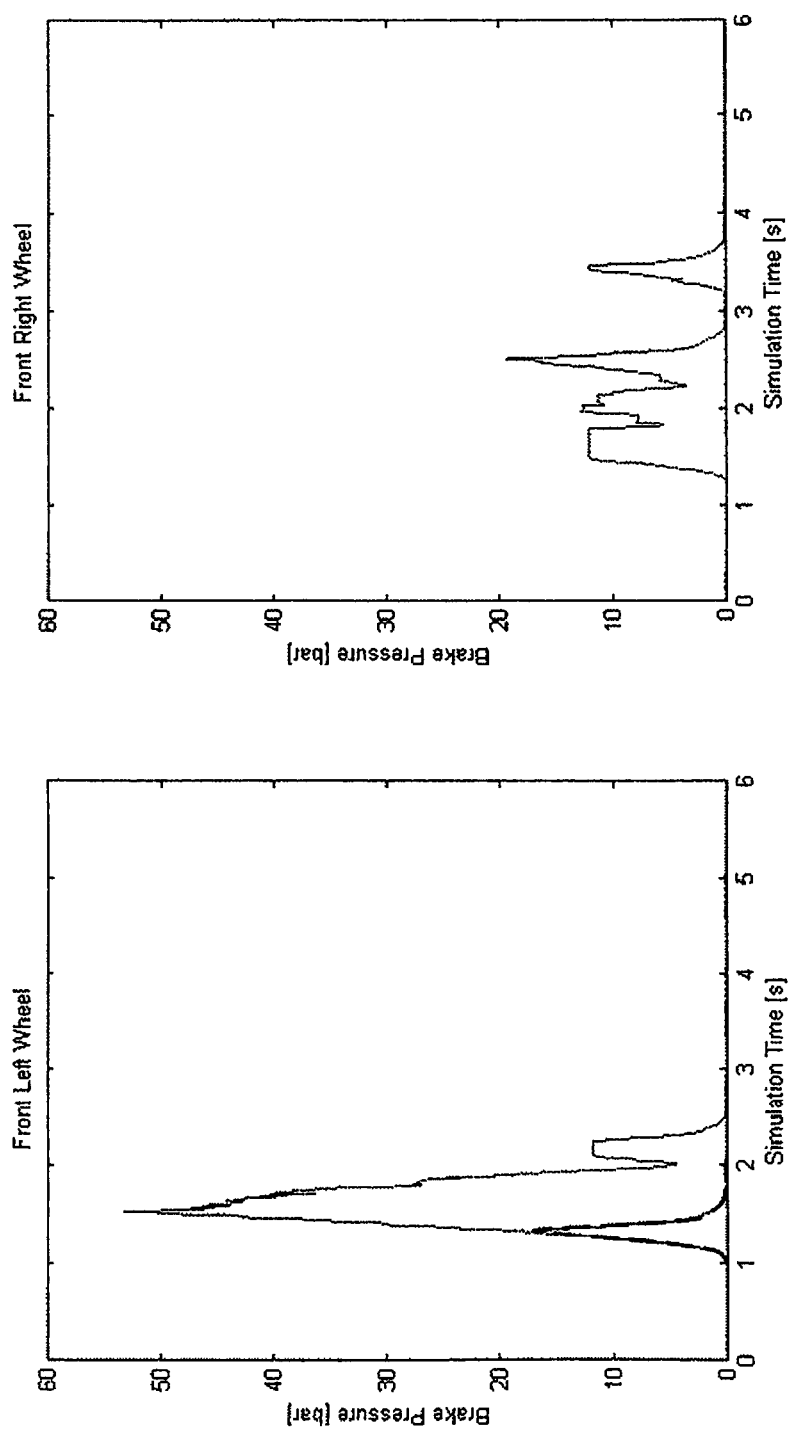
FIG. 2 is a comparison of the yaw control pressure for different interventions of a vehicle having a prior art yaw stability control system and a vehicle having a yaw stability control system in accordance with an embodiment of the present invention.

In the intervention yaw control pressure comparison of FIG. 2, the dashed line represents a vehicle equipped with standard yaw stability control while the solid line represents a vehicle equipped with post impact heading angle correction in accordance with the present invention in addition to the standard yaw stability control. The vehicle's velocity before the impact is 150 km/h and the steering wheel angle δ is fixed to zero, simulating a passive driver, during the entire simulation.

Figure 3:
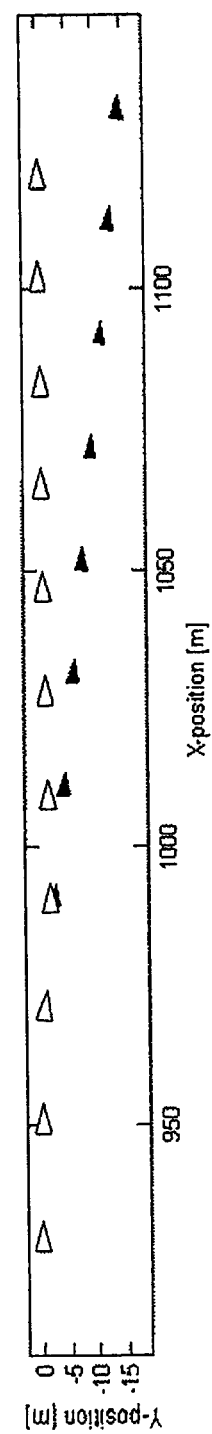
FIG. 3 is a schematic comparison of trajectories after receiving a body-force-disturbance for a vehicle having a prior art yaw stability control system and a vehicle having a yaw stability control system in accordance with the present invention.

The benefit of post impact heading angle correction can also be visualized by comparing the vehicle's trajectory after the impact. FIG. 3 depicts these trajectories in a simulation case where the vehicle is hit from the side in the right rear corner. The black vehicle is equipped with standard yaw stability control while the white vehicle is equipped with post impact heading angle correction in accordance with the present invention in addition to the standard yaw stability control. The vehicle's velocity before the impact is 150 km/h and the steering wheel angle δ is fixed to zero, simulating a passive driver, during the entire simulation.

Modifications to embodiments of the invention described in the foregoing are possible without departing from the scope of the invention as defined by the accompanying claims.

Thus, while there have been shown and described and pointed out features of the invention as applied to a preferred embodiment thereof, it will be understood that various omissions and substitutions and changes in the form and details of the devices illustrated, and in their operation, may be made by those skilled in the art. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed:

1. A yaw stability control system for an automotive vehicle comprising:
at least one yaw rate sensor generating a vehicle yaw rate signal;
a yaw rate model generator receiving a steering input and generating a reference yaw rate signal;
a yaw rate error module comparing the vehicle yaw rate signal with the reference yaw rate signal and calculating a yaw rate error signal;
a yaw angle error module receiving the reference yaw rate signal and generating a reference yaw angle signal, receiving the vehicle yaw rate signal and generating a vehicle yaw angle signal, and comparing the reference yaw angle signal and the vehicle yaw angle signal to generate a yaw angle error signal;
at least one body-force-disturbance sensor unit detecting a body-force-disturbance experienced by the vehicle, the body-force-disturbance distinguished from a tire-force-disturbance based upon at least one of a magnitude of sensor signals and a quality of sensor signals; and
a yaw control module generating control signals to be sent to at least one yaw actuator, prior to the detection of the body-force-disturbance the control signals being based upon the yaw rate error signal, and following the body-force-disturbance the control signals being based upon the yaw angle error signal in combination with the yaw rate error signal, the reference yaw rate signal after the detection of the body-force-disturbance being generated based upon the steering input over a time period beginning before the detection of the body-force-disturbance and ending after the detection of the body-force-disturbance.

2. The yaw stability control system according to claim 1, wherein the yaw angle error module performs an integration of the reference yaw rate signal to generate the reference yaw angle signal, and performs an integration of the vehicle yaw rate signal to generate the vehicle yaw angle signal.

3. The yaw stability control system according to claim 1, wherein the time period begins 0.1-1 second before detection of the body-force-disturbance.

4. The yaw stability control system according to claim 2, wherein the yaw angle error module performs the integration of the yaw rates during the time period using window integrals by which the yaw rate signals are integrated over defined time windows.

5. The yaw stability control system according to claim 1, wherein the yaw angle error signal controller is arranged such that the yaw angle control part fades out towards the end of the time period.

6. The yaw stability control system according to claim 1, wherein the duration of the time period is based at least in part upon a side slip angle of the vehicle.

7. The yaw stability control system according to claim 6, wherein the time period ends when the side slip angle falls below 40 degrees.

8. The yaw stability control system according to claim 1, further comprising a yaw rate derivative module receiving the yaw rate error signal and calculating a time derivative used by the yaw control module to generate control signals.

9. A method of improving yaw stability of an automotive vehicle subjected to a body-force-disturbance comprising the steps of:
- determining a reference yaw rate signal based at least in part upon a driver steering input;
- detecting a vehicle yaw rate of the vehicle and generating a vehicle yaw rate signal;
- comparing the reference yaw rate signal and the vehicle yaw rate signal to calculate a yaw rate error signal;
- activating at least one yaw control actuator in response to at least the yaw rate error signal to reduce a magnitude of the yaw rate error signal;
- calculating a reference yaw angle signal from at least the reference yaw rate signal;
- calculating a vehicle yaw angle signal from at least the vehicle yaw rate signal;
- comparing the reference yaw angle signal and the vehicle yaw angle signal to calculate a yaw error signal;
- detecting the body-force-disturbance experienced by the vehicle, the body-force-disturbance being distinguished from a tire-force-disturbance based upon at least one of a magnitude of sensor signals and a quality of sensor signals; and
- after the detection of the body-force-disturbance, determining the reference yaw angle signal used to calculate the yaw angle error signal based upon driver steering inputs occurring over a time period beginning before the detection of the body-force-disturbance and ending after the detection of the body-force disturbance; and
- activating the at least one yaw control actuator in response to the yaw angle error signal in combination with the yaw rate error signal.

10. The method according to claim 9 further comprising the steps of:
- calculating a time derivative of the yaw rate error signal; and
- activating the at least one yaw control actuator in response in part to the time derivative.

11. The method according to claim 9, wherein after the detection of the body-force-disturbance the driver steering inputs used to determine the reference yaw angle signal are tracked over a time period having a duration based at least in part upon a side slip angle of the vehicle.

12. The method according to claim 11, wherein the time period ends when the side slip angle falls below 40 degrees.

* * * * *